US009552667B2

(12) United States Patent
He et al.

(10) Patent No.: US 9,552,667 B2
(45) Date of Patent: Jan. 24, 2017

(54) ADAPTIVE SHADING IN A GRAPHICS PROCESSING PIPELINE

(71) Applicant: NVIDIA CORPORATION, Santa Clara, CA (US)

(72) Inventors: Yong He, Pittsburgh, PA (US); Eric B. Lum, San Jose, CA (US); Eric Enderton, Berkeley, CA (US); Henry Packard Moreton, Woodside, CA (US); Kayvon Fatahalian, Stanford, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/106,580

(22) Filed: Dec. 13, 2013

(65) Prior Publication Data

US 2015/0170408 A1 Jun. 18, 2015

(51) Int. Cl.
   *G06T 15/00* (2011.01)
   *G06T 15/80* (2011.01)
   *G06T 1/20* (2006.01)

(52) U.S. Cl.
   CPC .............. *G06T 15/80* (2013.01); *G06T 15/00* (2013.01); *G06T 15/005* (2013.01); *G06T 1/20* (2013.01)

(58) Field of Classification Search
   CPC .......... G06T 1/20; G06T 15/005; G06T 15/00; G06T 15/80
   USPC .......................... 345/420, 423, 426, 557, 582
   See application file for complete search history.

(56) References Cited

U.S. PATENT DOCUMENTS

| | | | | |
|---|---|---|---|---|
| 5,163,126 | A * | 11/1992 | Einkauf et al. | 345/423 |
| 5,253,339 | A * | 10/1993 | Wells et al. | 345/426 |
| 7,538,779 | B2 * | 5/2009 | Hastings | G06T 11/203 |
| | | | | 345/611 |
| 8,068,117 | B2 * | 11/2011 | Lefebvre et al. | 345/582 |
| 8,605,086 | B2 * | 12/2013 | Everitt et al. | 345/426 |
| 8,860,742 | B2 * | 10/2014 | Shebanow et al. | 345/557 |
| 8,941,653 | B2 * | 1/2015 | Molnar et al. | 345/420 |
| 9,013,498 | B1 * | 4/2015 | Montrym et al. | 345/582 |

OTHER PUBLICATIONS

Yang et al, Geometry-Aware Framebuffer Level of Detail, Eurographics symposium on Rendering 2008, vol. 27, No. 4, 2008, pp. 1183-1188.*

(Continued)

*Primary Examiner* — Phu K Nguyen
(74) *Attorney, Agent, or Firm* — Artegis Law Group, LLP

(57) ABSTRACT

One embodiment of the present invention includes a parallel processing unit (PPU) that performs pixel shading at variable granularities. For effects that vary at a low frequency across a pixel block, a coarse shading unit performs the associated shading operations on a subset of the pixels in the pixel block. By contrast, for effects that vary at a high frequency across the pixel block, fine shading units perform the associated shading operations on each pixel in the pixel block. Because the PPU implements coarse shading units and fine shading units, the PPU may tune the shading rate per-effect based on the frequency of variation across each pixel group. By contrast, conventional PPUs typically compute all effects per-pixel, performing redundant shading operations for low frequency effects. Consequently, to produce similar image quality, the PPU consumes less power and increases the rendering frame rate compared to a conventional PPU.

25 Claims, 7 Drawing Sheets

(56) References Cited

OTHER PUBLICATIONS

Fernando, R., Fernandez, S., Bala, K., & Greenberg, D. P. (Aug. 2001). Adaptive shadow maps. In Proceedings of the 28th annual conference on Computer graphics and interactive techniques (pp. 387-390). ACM, Aug. 2001.*

* cited by examiner

ADAPTIVE SHADING IN A GRAPHICS PROCESSING PIPELINE

BACKGROUND OF THE INVENTION

Field of the Invention

Embodiments of the present invention relate generally to graphics processing and, more specifically, to adaptive shading in a graphics processing pipeline.

Description of the Related Art

A typical computer system includes a central processing unit (CPU) and a graphics processing unit (GPU). Some GPUs are capable of very high performance using a relatively large number of small, parallel execution threads on dedicated programmable hardware processing units. The specialized design of such GPUs usually allows these GPUs to perform certain tasks, such as rendering 3-D scenes, much faster than a CPU. However, the specialized design of these GPUs also limits the types of tasks that the GPU can perform. By contrast, the CPU is typically a more general-purpose processing unit and therefore can perform most tasks. Consequently, the CPU usually executes the overall structure of a software application and then configures the GPU to implement a graphics processing pipeline that transform 3-D images generated by the software application into rendered 2-D images.

As part of transforming a 3-D image, the image is divided into a two dimensional array of pixels, each representing a different image location. The dimensions of this two dimensional array of pixels defines the resolution of the rendered 2-D image. In general, as part of processing a pixel, a pixel shading subsystem included in the graphics processing pipeline performs a variety of per-pixel shading calculations designed to accurately determine the color of the pixel based on effects such as lighting. However, the viewer's ability to resolve images may exceed the resolution of the rendered 2-D image. Consequently, visual artifacts produced during the rendering may dramatically, and often unacceptably, reduce the realism of the 2-D image. For example, if an edge of a triangle is not aligned with a vertical or horizontal line of pixel locations, the edge will exhibit a jagged, stair-step appearance in the rendered 2-D image.

One approach to improving the realism of rendered images is to increase the resolution of the rendered 2-D image. Increasing the resolution improves the ability of the pixel shading subsystem to accurately portray certain effects at particular portions of rendered images. For example, increasing the resolution may enable the graphics processing pipeline to smooth the appearance of edges. However, portions of many rendered images exhibit relatively uniform visual characteristics, and increasing the resolution does not improve the realism of such portions of rendered images. In addition, certain types of effects (e.g., ambient lighting) are applied relatively uniformly across the image and, consequently, increasing the resolution may cause the pixel shading subsystem to perform redundant pixel shading calculations. Notably, the majority of the execution time required during rendering is spent performing operations, such as texture fetches, associating with the pixel shading calculations. Consequently, increasing the resolution may lead to both an increase in power consumption and a decrease in rendering frame rate that is disproportionate to the improvement in the quality of the rendered image.

Accordingly, what is needed in the art is a more effective approach to improving the realism of rendered images.

SUMMARY OF THE INVENTION

One embodiment of the present invention sets forth a method for performing pixel shading operations. The method includes performing a first pixel shading operation on a first pixel to compute a first coarse shading value that is associated with the first pixel; computing a second coarse shading value based on the first coarse shading value, where the second coarse shading value is associated with a second pixel; performing a second pixel shading operation on the first pixel to compute a first fine shading value that is associated with the first pixel; performing the second pixel shading operation on the second pixel to compute a second fine shading value that is associated with the second pixel; computing a first composite shading value that is associated with the first pixel based on the first coarse shading value and the first fine shading value; and computing a second composite shading value that is associated with the second pixel based on the second coarse shading value and the second fine shading value.

One advantage of the disclosed approach is that a pixel shading subsystem may adaptively optimize the granularity at which pixel shading performed. The pixel shading subsystem performs shading operations that exhibit high-frequency variations across a pixel block for each pixel in the pixel block, enabling rendered image quality consistent with the resolution. By contrast, the pixel shading subsystem performs shading operations that exhibit low-frequency variations across a pixel block only for selected pixels in the pixel block, thereby reducing redundant shading operations compared to conventional pixel shading subsystems. Consequently, to produce similar image quality, the pixel shading subsystem consumes less power and increases the rendering frame rate compared to a conventional pixel shading subsystem.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
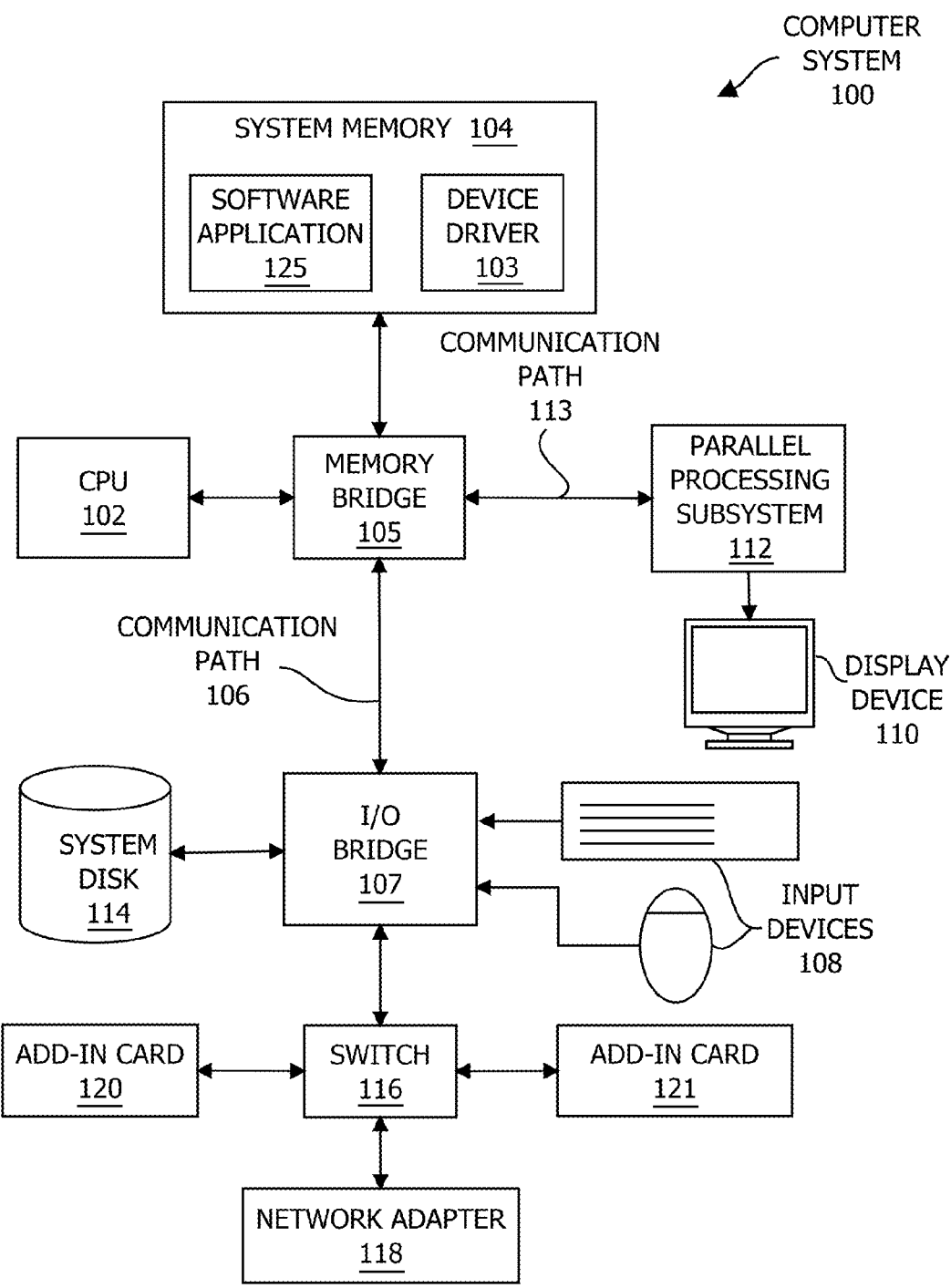
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. The system memory 104 also includes a software application 125 that executes on the CPU 102 and may issue commands that control the operation of the PPUs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
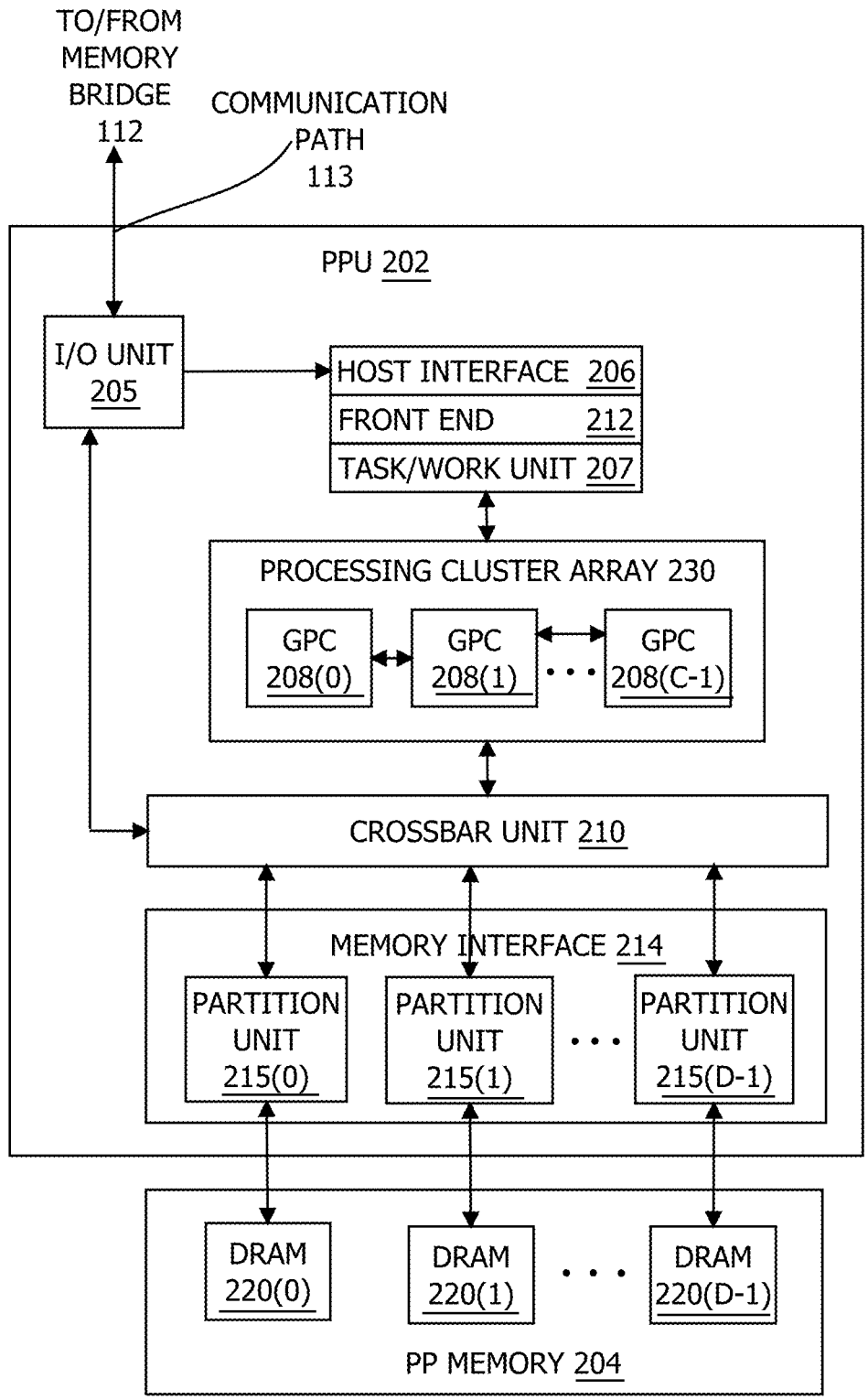
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics processing pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
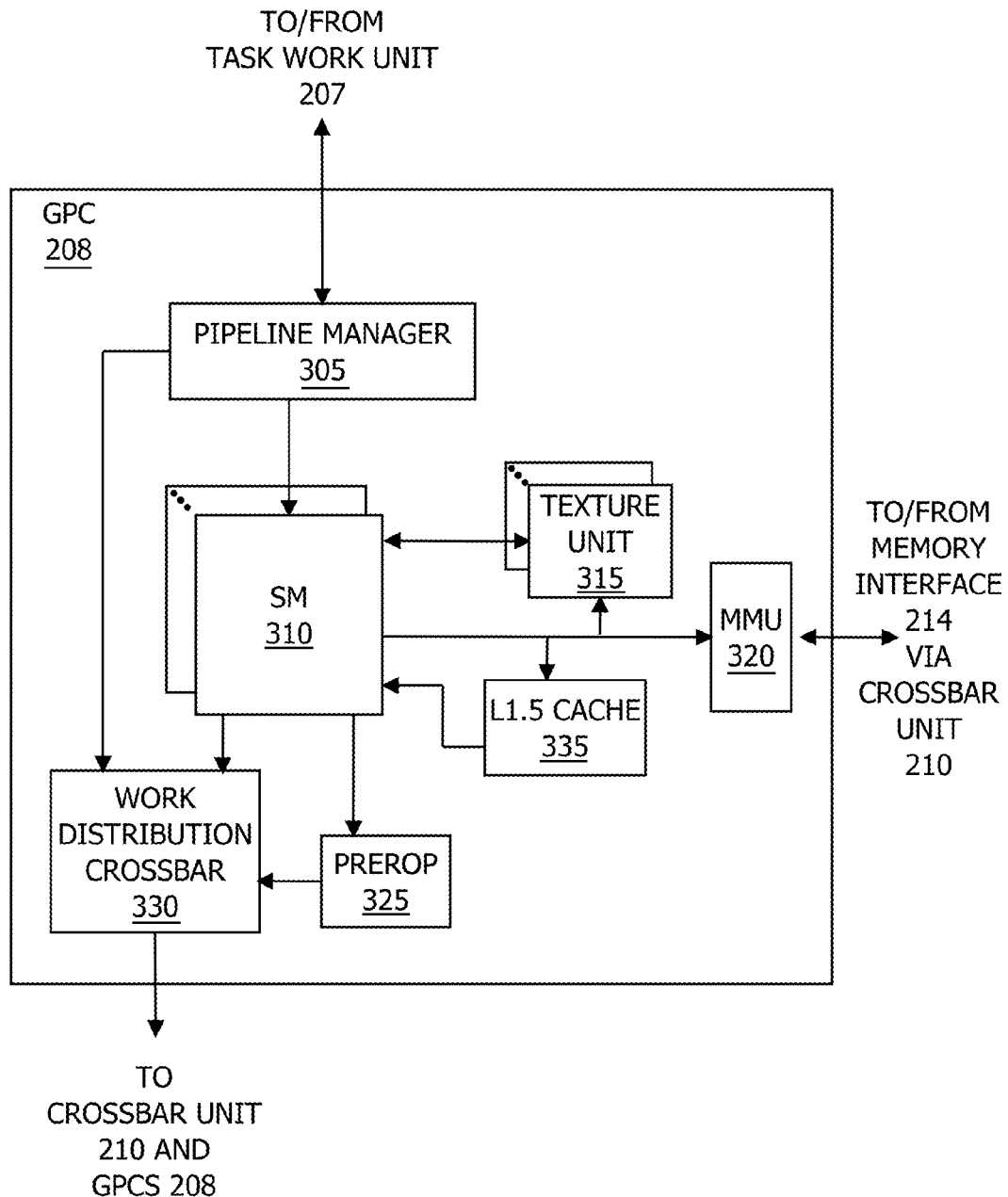
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Pixel Shading at Different Granularities

Again, the GPC 208 can be programmed to execute processing tasks relating to a wide variety of applications, including image rendering operations. In particular, a pixel shading subsystem (not shown in FIG. 3) may be implemented within the GPC 208 and configured to execute fragment shading programs to shade input fragments as part of a graphics processing pipeline. In various embodiments, the pixel shading subsystem may be programmed to perform operations such as perspective correction, texture mapping, shading, blending, and the like, to produce shaded fragments that are transmitted to a raster operations (ROP) unit.

As part of executing the fragment shading programs, the pixel shading subsystem performs pixel shading operations at a variable granularity. For low frequency effects (e.g., ambient light that is relatively uniform across a set of pixels), coarse shading units included in the pixel shading subsystem perform the associated pixel shading operations on a subset of the pixels instead of per-pixel. In this fashion, the pixel shading subsystem reduces the number of redundant pixel shading operations associated with low frequency effects compared to conventional pixel shading units. By contrast, for high frequency effects (e.g., albedo texturing), fine shading units included in the pixel shading subsystem perform the associated pixel shading operations on each pixel. Advantageously, by strategically tuning the shading granularity, the pixel shading subsystem reduces the number of redundant pixel shading operations associated with low frequency effects compared to conventional pixel shading subsystem without sacrificing rendered image quality.

Figure 4:
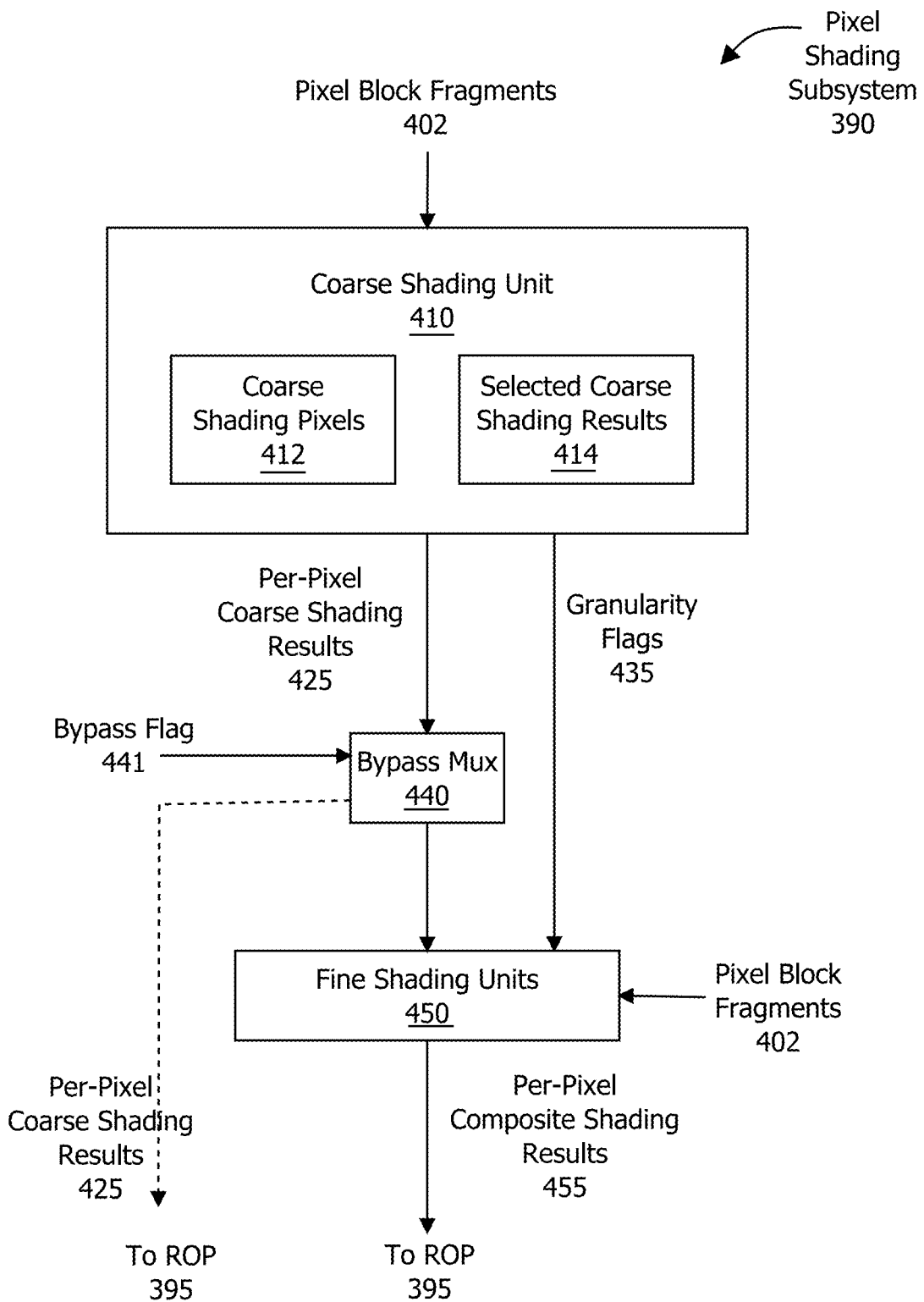
FIG. 4 is a conceptual diagram illustrating a pixel shading subsystem that can be implemented within the general processing cluster of FIG. 3 according to one embodiment of the present invention.

FIG. 4 is a conceptual diagram illustrating a pixel shading subsystem 390 that can be implemented within the general processing cluster 208 of FIG. 3 according to one embodiment of the present invention. As shown, the pixel shading subsystem 390 includes a coarse shading unit 410, a bypass multiplexer (mux) 440, and fine shading units 450. The pixel shading subsystem 390 receives pixel block fragments 402 from a rasterizer unit, performs pixel shading operations, and transmits per-pixel shading results to a ROP unit 395 for further processing.

The pixel block fragments 402 include graphics data used by the pixel shading subsystem 390 to perform pixel shading operations on the pixels included in a particular pixel block. Typically, the pixel block fragments 402 include shading inputs (e.g., color values, opacity values, coverage data, and depth information) for each pixel in the associated pixel block. In particular, the pixel block fragments 402 represent coverage data and depth information as a pixel block visibility mask (not shown in FIG. 4) that indicates whether each of the fragments is potentially viewable in the final rendered image. To efficiently leverage the architecture of the PPU 202, each set of pixel block fragments 402 includes fragments that are associated with a four-by-four pixel block of sixteen pixels. Further, each set of pixel block fragments 402 is subdivided into four sets of fragments, known as "quads," that are associated with square two-by-two pixel regions. Typically, if a graphics primitive covers any of the pixels in a particular two-by-two pixel region, then the rasterizer unit 385 generates a quad, and the pixel shading subsystem 390 computes per-pixel composite shading results 455 for each of the pixels in the two-by-two pixel region.

In alternate embodiments, the pixel shading subsystem 390 may receive graphics data associated with any number of pixels, arranged in any fashion. For example, the pixel shading subsystem 390 may receive fragments that are associated with sixteen-by-sixteen pixel regions that include sixty-four pixels. Further, each sixteen-by-sixteen pixel region may be subdivided into four-by-four pixel regions.

In general, the pixel shading subsystem 390 performs multiple sets of pixel shading operations, each of which is associated with a different shading effect. As persons skilled in the art will recognize, certain shading effects may typically vary at a high frequency across each pixel block, while other shading effects may typically vary at a low frequency across each pixel block. Further, certain shading effects may vary at a high frequency across one pixel block and at a low frequency across another pixel block. Advantageously, the pixel shading subsystem 390 is configured to dynamically tune the granularity of the pixel shading operations associated with each shading effect to reduce redundant pixel shading operations while preserving the quality of the rendered image. The coarse shading unit 410 performs pixel shading operations on only a subset of the pixels included in each pixel block. By contrast, the fine shading units 450 perform pixel shading operations on each pixel included in each pixel block. Accordingly, the coarse shading unit 410 performs pixel shading operations associated with typically low frequency effects, and the fine shading units 450 perform pixel shading operations associated with typically high frequency effects.

To optimize the quality of the rendered image, the coarse shading unit 410 analyzes the results of the pixel shading operations associated with nominally low frequency effects to determine whether any of these effects vary at an unexpectedly high frequency across the pixel block. If the coarse shading unit 410 determines that a nominally low frequency effect is a high frequency effect across the pixel block, then the fine shading units 450 also performs the pixel shading operations associated with the particular effect. Notably, for such a shading effect, the fine shading units 450 perform the same type of pixel shading operations as the coarse shading unit 410, but perform the operations on all pixels in the pixel block instead of on a subset of pixels in the pixel block.

As shown, the coarse shading unit 410 includes coarse shading pixels 412 and selected coarse shading results 414 (also sometimes referred to as "coarse shading samples"). In operation, the coarse shading unit 410 receives the pixel block fragments 402 and selects a subset of the pixels included in the pixel block as the coarse shading pixels 412. The coarse shading unit 410 may select the coarse shading pixels 412 in any technically feasible fashion. In general, the coarse shading unit 410 implements a selection process that avoids shading errors attributable to extrapolating shading results for pixels that lie outside the boundaries of the coarse shading pixels 412. A secondary objective of the selection process is to decrease graphics primitive attribute errors attributable to performing pixel shading operations on coarse shading pixels 412 that lie outside the graphics primitive corresponding to the pixel block fragments 402.

For instance, suppose that the pixel block fragments 402 were to correspond to a triangle that covered only the four innermost pixels included in the pixel block. Further, suppose that the coarse shading unit 410 were to select the four corner pixels as the coarse shading pixels 412. In such a scenario, no pixels would like outside the boundaries of the coarse shading pixels 412, consequently shading errors attributable to extrapolating shading results would be reduced. However, the coarse shading pixels 412 would all lie outside the triangle. Consequently, the triangle attributes would likely exhibit errors due to extrapolating the triangle primitive, reducing the quality of the selected coarse shading results 414.

Advantageously, the coarse shading unit 410 selects the coarse shading pixels 412 to both reduce extrapolation of shading results and reduce primitive attribute extrapolation errors. In one embodiment, the coarse shading unit 410 selects the coarse shading pixels 412 based on the quads that include "covered" pixels. Note that pixels that lie inside the graphics primitive associated with the pixel block fragments 402 are considered "covered" by the graphics primitive and are referred to herein as "covered" pixels. First, the coarse shading unit 410 performs read operations on the pixel block visibility mask to determine the coverage of the pixels. The coarse shading unit 410 then identifies the quads that include one or more "covered" pixels and computes the smallest bounding rectangle that includes the identified quads. Finally, the coarse shading unit 410 sets the coarse shading pixels 412 to the four pixels at the locations corresponding to the vertices of the bounding rectangle.

For instance, if one of the four quads included in the pixel block fragments 402 is covered (i.e., includes at least one covered pixel), then the coarse shading unit 410 sets the bounding rectangle to match the 2×2 pixel region corresponding to the covered quad. Consequently, the coarse shading unit sets the four coarse shading pixels 412 to the four pixels in the covered quad. If two of the four quads are covered and these two quads are vertically aligned, then the coarse shading unit 410 sets the bounding rectangle to match the 2×4 pixel region corresponding to the covered quads. And the coarse shading unit sets the four coarse shading pixels 412 to two pixels in the first covered quad and two pixels in the second covered quad. If two of the four quads are covered and these two quads are horizontally aligned, then the coarse shading unit 410 sets the bounding rectangle to match the 4×2 pixel region corresponding to the covered quads. Therefore, the coarse shading unit sets the four coarse shading pixels 412 to two pixels in the first covered quad and two pixels in the second covered quad. If two of the four quads are covered and these two quads are kitty-corner to each other, then the coarse shading unit 410 sets the bounding rectangle to the 4×4 pixel block. Correspondingly, the coarse shading unit sets the four coarse shading pixels 412 to four corner pixels of the pixel block. Finally, if three or more of the four quads are covered, then the coarse shading unit 410 sets the bounding rectangle to the 4×4 pixel block, and the four coarse shading pixels 412 to the four corner pixels of the pixel block.

The relative locations of the pixels that the coarse shading unit 410 selects as coarse shading pixels 412 may vary for each pixel block. Advantageously, by employing a dynamic process to select the coarse shading pixels 412, the coarse shading unit 410 reduces errors in the shading results. In alternate embodiments, the coarse shading unit 410 may further optimize the selection process. In some alternate embodiments, the coarse shading unit 410 defines a bounding rectangle that includes all of the "covered" pixels in the pixel block while also including the highest feasible percentage of covered pixels to uncovered pixels. In such an embodiment, the coarse shading unit 410 may select the four center pixels included in the 4×4 pixel block as the coarse shading pixels 412.

After selecting the coarse shading pixels 412, the coarse shading unit 410 performs pixel shading operations on the coarse shading pixels 412 to generate the selected coarse shading results 414. The coarse shading unit 410 then performs less time-consuming operations to generate estimated shading results for each of the pixels that are not included in the coarse shading pixels 412 based on the selected coarse shading results 414. Thus, the coarse shading unit 410 generates per-pixel coarse shading results 425 that include the results of performing the pixel shading operations for the coarse shading pixels 412, but only estimated shading results for the remaining pixels included in the pixel block. For example, if the 4×4 pixel block is completed covered, then the per-pixel coarse shading results 425 may include the results of performing pixel shading operations on four pixels and estimated shading results for the remaining twelve pixels. Alternatively, if the 4×4 pixel block is only partially covered, then the per-pixel coarse shading results 425 may include estimated shading results for less than twelve pixels.

Again, because of the selection process, each covered pixel is guaranteed to lie within the rectangular region defined by the four coarse shading pixels 412. This enables the coarse shading unit 410 to perform interpolation operations within each quad to generate the estimated shading results for the pixels that are not included in the coarse shading pixels 412. In alternate embodiments, the coarse shading unit 410 may generate the estimated shading results in any technically feasible fashion. For instance, for each pixel that is not included in the coarse shading pixels 412, the coarse shading unit 410 may copy the per-pixel coarse shading results 425 associated with the closest coarse shading pixel 412.

As previously disclosed herein, the coarse shading unit 410 determines whether the estimated results are acceptable for each shading effect. If the coarse shading unit 410 determines that the estimated results associated with a particular shading effect are acceptable, then the coarse shading unit 410 deactivates (i.e., sets to a value of binary zero) an effect-specific bit included in granularity flags 435. If the coarse shading unit 410 determines that the estimated results associated with a particular shading effect are unacceptable, then the coarse shading unit 410 activates (i.e., set to a value of binary one) an effect-specific bit included in the granularity flags 435. Each of the granularity flags 435 applies to the entire pixel block. If the coarse shading unit 410 activates a particular effect-specific bit included in the granularity flags 435, then the per-pixel coarse shading results 425 associated with the effect are considered unacceptable for all of the pixels included in the pixel block.

The coarse shading unit 410 may determine the acceptability of the estimated results in any technically feasible fashion. For instance, the coarse shading unit 410 may implement effect-specific predicate logic to determine whether the estimated results are acceptable for a particular effect. The predicate logic may evaluate the pixel block fragments 402, the selected coarse shading results 414, the per-pixel coarse shading results 425, or any other graphics input data in any combination to evaluate the estimated results. In addition, the predicate logic may be implemented at any granularity. For instance, in some embodiments, the predicate logic may be implemented per pixel block. In other embodiments, the predicate logic may be implemented per quad. Further, the coarse shading unit 410 may communicate whether to re-compute the per-pixel coarse shading results 425 in any technically feasible fashion using any polarity and granularity of signal. For example, if the coarse shading unit 410 determines that the estimated results associated with a particular shading effect are unacceptable, then the coarse shading unit 410 may deactivate a per-pixel flag instead of activating a flag that is associated with the entire pixel block.

As shown, after the coarse shading unit 410 processes the pixel block fragments 402, the per-pixel coarse shading results 425 are routed to the bypass mux 440. If a bypass flag 441 is activated, then the pixel shading subsystem 390 transmits the per-pixel coarse shading results 425 to the ROP unit 395 for further processing. If the bypass flag 441 is not activated, then the pixel shading subsystem 390 transmits the per-pixel coarse shading results 425 to the fine shading units 450 for further processing. Advantageously, the bypass flag 441 enables the software application 125 to forgo per-pixel shading operations in favor of reducing power consumption and increasing image rending rate. Notably, in such a scenario, the coarse shading unit 410 is configured to perform pixel shading operations associated with all the shading effects. The bypass mux 440 may be implemented in any technically feasible fashion using any polarity of bypass flag 441 or any type of selection signal. In alternate embodiments, the pixel shading subsystem 390 may not include a bypass mux 440, and the per-pixel coarse shading results 425 are processed by the fine shading units 450 prior to transmission to the ROP unit 395.

If the bypass flag 441 is not activated, then the fine shading units 450 receive the per-pixel coarse shading results 425, the granularity flags 435, and the pixel block fragments 402. The fine shading units 450 perform pixel shading operations associated with both nominally high frequency effects and any nominally low frequency effects that are associated with an activated bit in the granularity flags 435. Typically, the per-pixel coarse shading results 425 do not include results corresponding to nominally high frequency effects. However, the per-pixel coarse shading results 425 may include results corresponding to nominally low frequency effects that are associated with an activated bit in the granularity flags 435, and the fine shading units 450 discard such results. After performing the appropriate per-pixel shading operations for each pixel included in the pixel block, the fine shading units 450 combine these fine shading results with any retained (i.e., acceptable) per-pixel coarse shading results to create the per-pixel composite shading results 455. Subsequently, the pixel shading subsystem 390 transmits the per-pixel composite shading results 455 to the ROP unit 395 for further processing.

Figure 5:
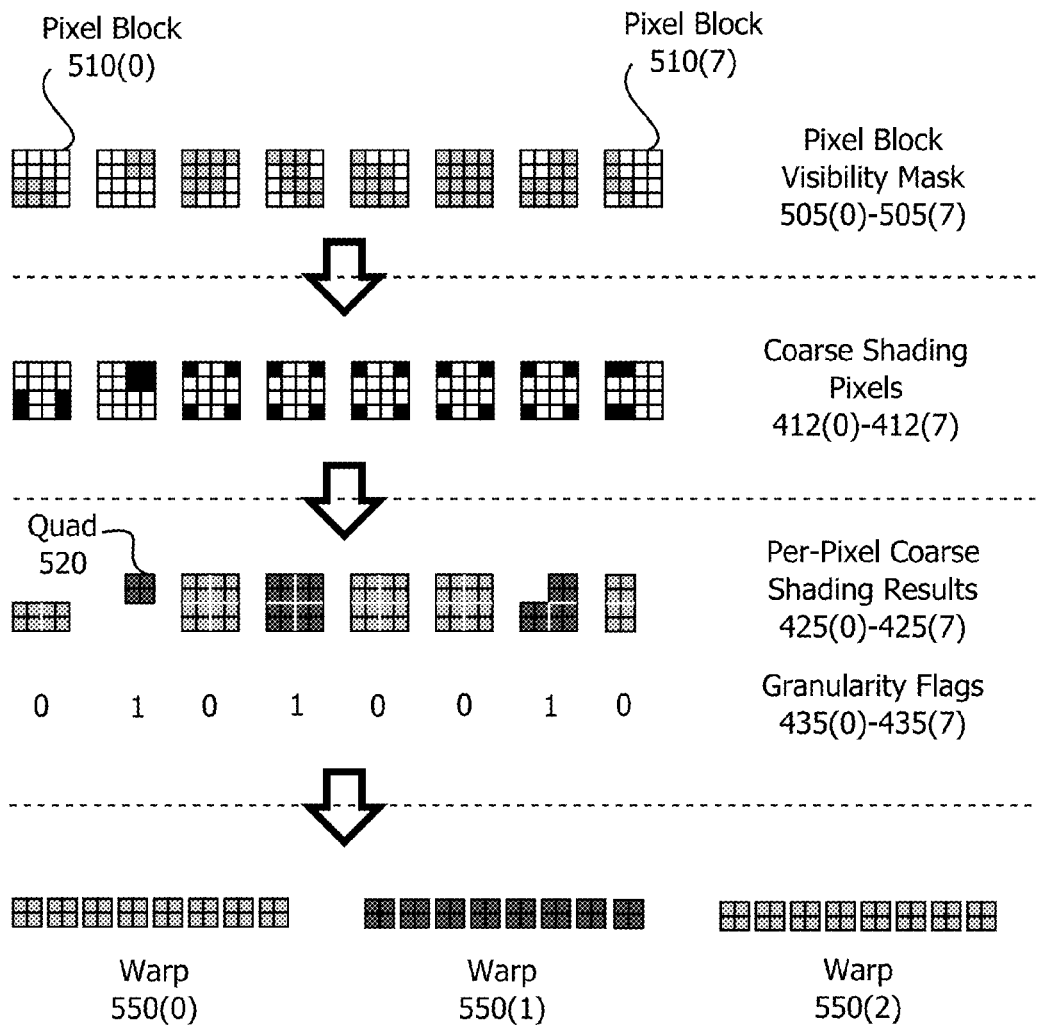
FIG. 5 is a conceptual diagram illustrating how the pixel shading subsystem of FIG. 4 may perform pixel shading operations at variable shading granularities, according to one embodiment of the present invention.

FIG. 5 is a conceptual diagram illustrating how the pixel shading subsystem 390 of FIG. 4 may perform pixel shading operations at variable shading granularities, according to one embodiment of the present invention. As shown, FIG. 5 depicts eight different four-by-four pixel blocks 510(0) through 510(7). Further, each pixel block 510 includes four two-by-two quads 520.

For explanatory purposes only, to leverage the architecture of the PPU 202, each coarse shading unit 410 processes a single pixel block 510 and each fine shading unit 450 processes a single quad 520. Four threads execute within each coarse shading unit 410, each thread performing pixel shading operations on one of the four coarse shading pixels 412. And four threads execute within each fine shading unit 450, each thread performing pixels shading operations on a single pixel included in the two-by-two pixel region corresponding to a covered quad 520. In addition, each warp includes 128 threads and, consequently, a warp may perform coarse shading operations on eight four-by-four pixel blocks 510 or fine shading operations on eight two-by-two quads 520.

In alternate embodiments, the PPU 202 may be configured to implement any number and combination of coarse shading units 410 and fine shading units 450. Further, each coarse shading unit 410 and each fine shading unit 510 may process any number of pixels, organized in any fashion. Finally, any number of threads may be assigned to perform pixel shading operations at any granularity in any combination.

As shown, a pixel block visibility mask 505(0) associated with the pixel block 510(0) includes six covered pixels that are included in two horizontally-aligned quads 520. Consequently, a particular coarse shading unit 410 selects the four corner pixels corresponding to the four-by-two pixel region that includes the two covered pixels quads as the coarse shading pixels 412(0). Subsequently, for each of the four coarse shading pixels 412(0), a separate thread performs pixel shading operations associated with nominally low-frequency shading effects. As shown, the threads generate the per-pixel coarse shading results 425(0) and the granularity flags 435(0) for the two covered quads. The coarse shading unit 410 generates neither per-pixel shading results 425(0) nor granularity flags 435(0) for the two uncovered quads. The granularity flags 435(0) includes one bit representing the granularity for one shading effect. In particular, the granularity flags 435(0) indicate that the shading effect varies at a low frequency across the pixel block 510(0).

Similarly, additional coarse shading units 410 process the pixel blocks 510(1) through 510(7). As shown, the granularity flags 435 indicate that the shading effect varies at a low frequency across the pixel blocks 510(0), 510(2), 510(4), 510(5), and 510(7). The granularity flags 435 also indicate that the shading effect varies at a high frequency across the pixel blocks 510(1), 510(3), and 510(6). As disclosed previously herein, if a particular effect-specific bit in the granularity flags 435 is not activated, then the fine shading unit 450 considers the contribution of the effect to be adequately represented by the corresponding per-pixel coarse shading result 425. If the bit is activated, then the fine shading unit 450 discards the corresponding per-pixel coarse shading result 425 and performs per-pixel shading operations to determine fine granularity per-pixel shading results. Consequently, the fine shading units 450 are configured to discard the per-pixel coarse shading results 425 for eight of the twenty-four covered quads 520 and perform per-pixel shading operations to determine the contribution of the associated shading effect. Further, the fine shading units 450 are configured to accept the per-pixel coarse shading results 425 for sixteen of the twenty-four covered quad 520 as the contribution of the associated effect. Thus, the number and type of shading operations that each fine shading unit 450 performs varies based on the granularity flags 435.

In some embodiments, the pixel shading subsystem 390 is configured to reduce divergent SIMT warps that execute within the fine shading units 450. In particular, prior to launching the threads that execute per-quad within the fine shading units 450, the pixel shading subsystem 390 strategically "packs" the quads 520 into coherent warps 550 based on the granularity flags 435. As shown, the pixel shading subsystem 390 assigns the quads 520 associated with the granularity flags 435 that equal binary zero to be shaded per-pixel by threads in warps 550(0) and 550(2), and the quads 520 associated with the granularity flags 435 that equal binary one to be shaded per-pixel by threads in warp 550(1). Advantageously, increasing the coherence of the warps 550 leverages the architecture of the PPU 202 to optimize the effectiveness of the graphics processing pipeline 350.

In alternate embodiments, the pixel shading subsystem 390 may assign quads 520 to be processed by threads in particular warps 550 based on multiple bits included in the granularity flags 435. For instance, the pixel shading subsystem 390 may assign quads 520 associated with granularity flags 435 that indicate that two of three shading effects require per-pixel shading to be processed by threads in a first warp 550. Further, the pixel shading subsystem 390 may assign quads 520 associated with granularity flags 435 that indicate that one of three shading effects requires per-pixel shading to be processed by threads in a second warp 550. Finally, the pixel shading subsystem 290 may assign quads 520 associated with granularity flags 435 that indicate that none of three shading effects require per-pixel shading to be processed by threads in a third warp 550.

As persons skilled in the art will recognize, the techniques disclosed herein may be modified to optimize the performance of the graphics processing pipeline 350 and/or the rendered image quality. For instance, in some embodiments, the pixel shading subsystem 390 may be configured to implement a uniform level-of-detail across each graphics primitive. In such embodiments, the pixel shading subsystem 390 may perform scaling operations to enforce the selected level-of-detail. In other embodiments, the coarse shading unit 410 may select the coarse shading pixels 412 to reduce redundant pixel shading operations across multiple pixel blocks 510. Alternatively, the pixel shading subsystem 390 may cache shared shading results associated with certain pixel blocks 510 for reuse by other pixel blocks 510.

Figure 6:
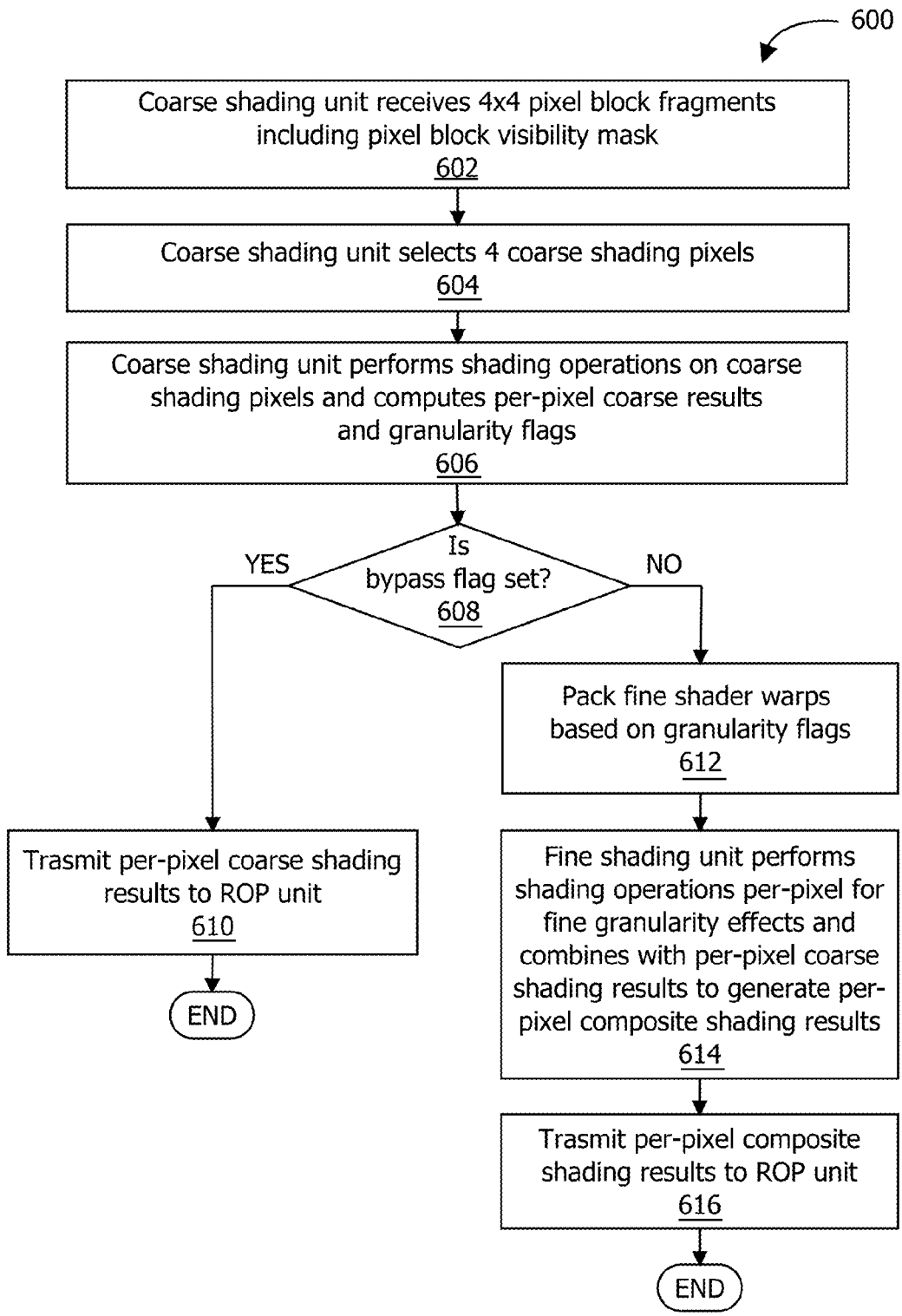
FIG. 6 is a flow diagram of method steps for performing pixel shading at variable shading granularities, according to one embodiment of the present invention.

FIG. 6 is a flow diagram of method steps for performing pixel shading at variable shading granularities, according to one embodiment of the present invention. Although the method steps are described with reference to the systems of FIGS. 1-5, persons skilled in the art will understand that any system configured to implement the method steps, in any order, falls within the scope of the present invention.

As shown, a method 600 begins at step 602, where the coarse shading unit 410 receives the pixel block fragments 402 corresponding to a four-by-four pixel block 510. The pixel block fragments 420 include coverage information as the pixel block visibility mask 505. At step 604, the coarse shading unit 410 selects a subset of the pixels included in the pixel block 510 as a set of four coarse shading pixels 412 based on the pixel block visibility mask 505. Notably, the coarse shading unit 410 selects the coarse shading pixels 412 to both reduce extrapolation of shading results and reduce primitive attribute extrapolation errors. In alternate embodiments, the coarse shading unit 410 may select the coarse shading pixels 412 in any technically feasible fashion.

At step 606, the coarse shading unit 410 performs shading operations on each of the four coarse shading pixels 412 and then generates the per-pixel coarse shading results 425 and the granularity flags 435. As part of step 606, the coarse shading unit 410 performs interpolation operations to determine the per-pixel coarse shading results 425 for each of the pixels in the pixel block 510 that are not included in the coarse shading pixels 412. As previously disclosed herein, the granularity flags 435 reflect whether the per-pixel coarse shading results 425 are acceptable for each shading effect. The coarse shading unit 410 may determine the acceptability of the estimated results in any technically feasible fashion. If, at step 608, the pixel shading subsystem 390 determines that the bypass flag 441 is activated, indicating that per-pixel shading operations are not required, then the method 600 proceeds to step 610. At step 610, the pixel shading subsystem 390 transmits the per-pixel coarse shading results 425 to the ROP unit 395 for further processing, and the method 600 terminates.

At step 608, if the pixel shading subsystem 390 determines that the bypass flag 441 is not activated, then the method 600 proceeds to step 612. At step 612, the pixel shading subsystem 390 assigns the covered quads 520 associated with the pixel block 510 to threads that execute within the fine shading units 450. In particular, the pixel shading subsystem 390 assigns quads 520 with similar granularity flags 435 to threads that are included in the same warp 550. Advantageously, increasing the coherence of the warps 550 leverages the architecture of the PPU 202 to increase the effectiveness of the graphics processing pipeline 350. In alternate embodiments, in lieu of launching new threads that execute within the fine shading units 450, the pixel shading subsystem 390 reuses the threads that computed the per-pixel coarse shading results 425. In such embodiments, the pixel shading subsystem 390 may re-use the warps 550 and may execute within the fine shading units 450 as part of an execution loop.

At 614, the fine shading units 450 perform the pixel shading operations corresponding to fine granularity shading effects for each pixel included in the covered quads 520, Subsequently, the fine shading units 450 combines these per-pixel fine shading results with the retained per-pixel coarse shading results 425 to create the per-pixel composite shading results 455. At step 616, the pixel shading subsystem 390 transmits the per-pixel composite shading results 455 to the ROP unit 395 for further processing, and the method 600 terminates.

In alternate embodiments, after step 606 and instead of proceeding to step 608, the pixel shading subsystem 390 transmits the per-pixel coarse results 425 to the ROP unit 395 for further processing, and the method 600 terminates. In other words, the pixel shading subsystem 390 may not perform any of steps 608-616, the pixel shading subsystem 450 may not perform pixel shading operations at a fine granularity, and the pixel shading subsystem 390 may not generate per-pixel composite shading results 455. In such embodiments, the pixel shading subsystem 390 may not include the fine shading units 450.

Figure 7:
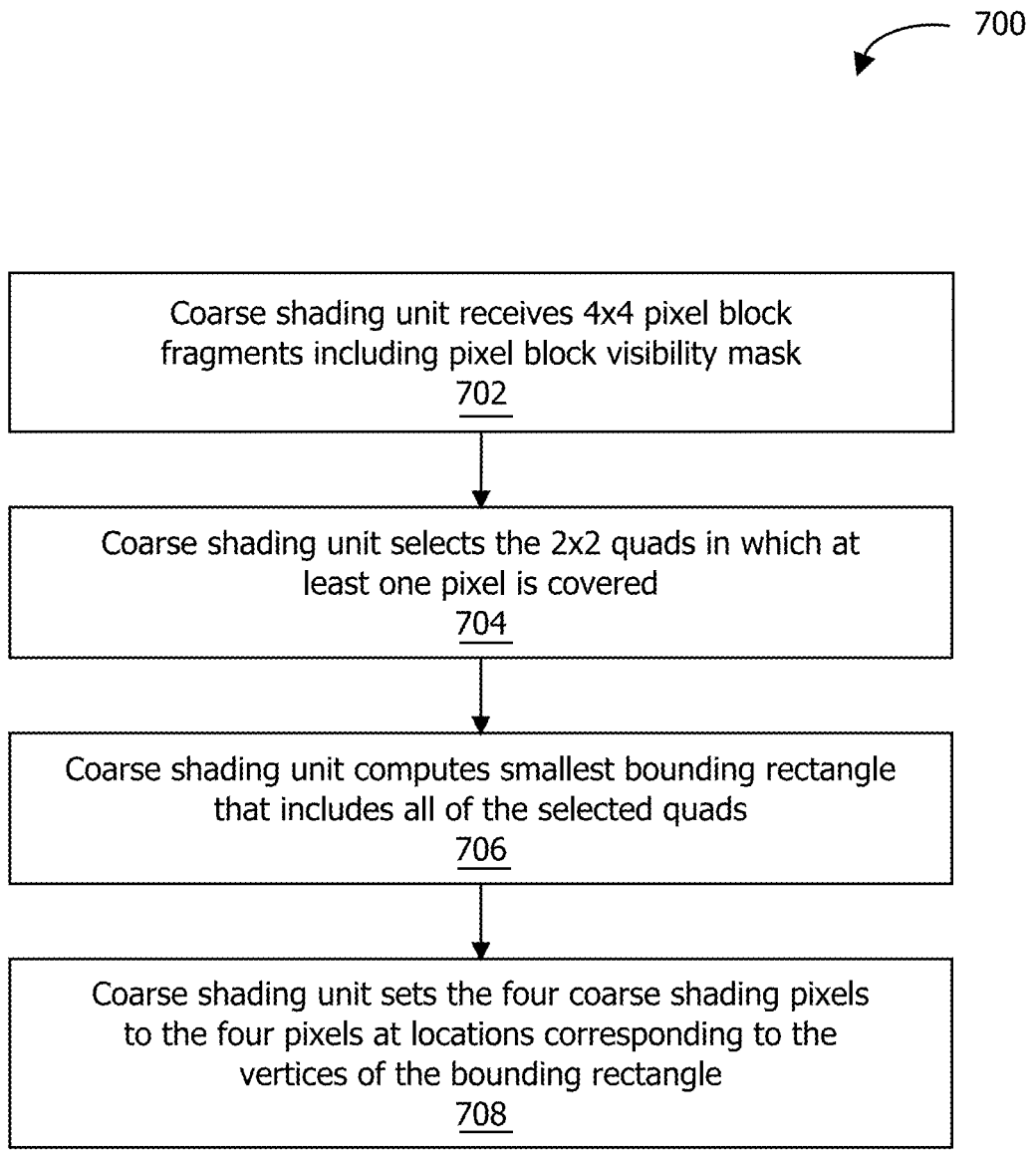
FIG. 7 is a flow diagram of method steps for selecting a subset of pixels on which to perform pixel shading operations, according to one embodiment of the present invention.

FIG. 7 is a flow diagram of method steps for selecting a subset of pixels on which to perform pixel shading operations, according to one embodiment of the present invention. Although the method steps are described with reference to the systems of FIGS. 1-5, persons skilled in the art will understand that any system configured to implement the method steps, in any order, falls within the scope of the present invention.

As shown, a method 700 begins at step 702, where the coarse shading unit 410 receives the pixel block fragments 402 corresponding to a four-by-four pixel block 510. The pixel block fragments 420 include coverage information as the pixel block visibility mask 505. At step 704, the coarse shading unit 410 performs read operations on the pixel block visibility mask 505 to determine the coverage of the pixels and selects the two-by-two quads 520 that include at least one covered pixel. At step 706, the coarse shading unit 410 computes the smallest bounding rectangle that includes the selected quads 520. At step 708, the coarse shading unit 410 sets the coarse shading pixels 412 to the four pixels at the locations corresponding to the vertices of the bounding rectangle. In this fashion, the coarse shading unit 410 selects the coarse shading pixels 412 to both reduce extrapolation of shading results and reduce graphics primitive attribute extrapolation errors based on the coverage of the quads 520.

In sum, a graphics processing pipeline implemented within a parallel processing unit (PPU) is configured to optimize the granularity of pixel shading operations. In one instance, the graphics processing pipeline includes a pixel shading subsystem that in turn includes both coarse shading units and fine shading units. For each 4×4 pixel block, a particular coarse shading unit performs shading operations on four coarse shading pixels included in the pixel block. In operation, the coarse shading unit interpolates the four coarse shading results to generate per-pixel coarse shading results for each of the covered pixels included in the pixel block. Further, for each shading effect, the coarse shading unit classifies the shading effect as low frequency or high frequency based on the corresponding coarse shading results and then sets a granularity flag to reflect this classification.

After a particular coarse shading unit processes a 4×4 pixel block, fine shading units process each 2×2 covered quad in the 4×4 pixel block guided by the per-pixel coarse shading results and the granularity flags. If a particular granularity flag indicates that an effect is a low frequency effect, then the fine shading unit considers the contribution of the effect to be adequately represented by the corresponding per-pixel coarse shading result. By contrast, if a particular granularity flag indicates that an effect is a high frequency effect, then the fine shading unit discards the corresponding per-pixel coarse shading results and performs per-pixel shading operations to determine fine granularity per-pixel shading results. Further, the fine shading units may perform additional shading operations that are associated with nominally high frequency shading effects. Subsequently, the fine shading units composite the contributions from each of the effects to generate per-pixel composite shading results. In alternate embodiments, the 4×4 pixel block may be replaced by any size of pixel block (e.g., 8×8). In general, the coarse pixel block granularity may vary, and the coarse pixel block granularity may be selected in any technically feasible fashion In one instance, the coarse shading unit selects the locations of the coarse shading pixels to reduce any inaccuracies attributable to generating sixteen per-pixel coarse shading results based on four selected coarse shading results. In operation, the coarse shading unit selects the 2×2 quads in which at least one pixel is covered. The coarse shading unit then determines the smallest bounding rectangle that includes all the selected quads. Finally, the coarse shading unit sets the four coarse pixels to the four pixel locations corresponding to the vertices of the bounding rectangle.

As persons skilled in the art will recognize, the number and type of shading operations that each fine shading unit performs varies based on the granularity flags. In some instances, the shading unit is configured to reduce divergent SIMT warps that execute within the fine shading units. In particular, prior to launching the threads that execute per-quad within the fine shading units, the shading unit strategically "packs" the quads into coherent warps based on the granularity flags.

Advantageously, the disclosed techniques enable the graphics processing pipeline to optimize the granularity at which pixel shading is performed. Since the PPU performs per-pixel shading operations for effects that exhibit high-frequency variation across a particular pixel block, the quality of rendered images is comparable to conventional PPUs that implement the same resolution. Further, because the PPU does not perform per-pixel shading operations for effects that exhibit low-frequency variation across a particular pixel block, the PPU performs fewer redundant shading operations than such conventional PPUs. Thus, the PPU may generate high quality rendered images without unnecessarily increasing power consumption or decreasing rendering frame rate.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for performing pixel shading operations within a pixel shading subsystem, the method comprising:
    selecting, from a plurality of pixels, a subset of pixels for coarse shading operations based on which pixels included in the plurality of pixels are covered by a graphics primitive;
    performing a first pixel shading operation on a first pixel included in the subset of pixels to compute a first coarse shading value that is associated with the first pixel;
    performing a second pixel shading operation on the first pixel to compute a first fine shading value that is associated with the first pixel; and
    computing a first composite shading value that is associated with the first pixel based on the first coarse shading value and the first fine shading value.

2. The method of claim 1, further comprising determining a second coarse shading value that is associated with a second pixel based on the first coarse shading value.

3. The method of claim 2, wherein determining the second coarse shading value comprises:
    performing the first pixel shading operation on a third pixel to compute a third coarse shading value that is associated with the third pixel;
    performing an interpolation operation between the first coarse shading value and the third coarse shading value to determine a first estimated value;
    determining that a first effect that is associated with the first pixel shading operation exhibits a low frequency variation across a first set of pixels that includes the first pixel, the second pixel, and the third pixel; and
    setting the second coarse shading value to equal the first estimated value.

4. The method of claim 3, wherein determining that the first effect exhibits a low frequency variation comprises:
    evaluating at least one of the first coarse shading value, the third coarse shading value, and the first estimated value; and
    deactivating a first granularity bit that is associated with both the first effect and the first set of pixels.

5. The method of claim 4, wherein the first set of pixels comprises a pixel block that includes a first quad, and deactivating the first granularity bit causes the first quad to be associated with a first warp that includes a first thread that computes the first composite shading value.

6. The method of claim 2, further comprising performing the second pixel shading operation on the second pixel to compute a second fine shading value that is associated with the second pixel; and computing a second composite shading value that is associated with the second pixel based on the second coarse shading value and the second fine shading value.

7. The method of claim 6, wherein computing the second composite shading value comprises combining the second coarse shading value, the second fine shading value, and a third fine shading value.

8. The method of claim 7, wherein determining the third fine shading value comprises:
performing a third pixel shading operation on the first pixel to determine a fourth coarse shading value that is associated with the first pixel;
determining that a second effect that is associated with the third pixel shading operation exhibits a high frequency variation across a first set of pixels that includes the first pixel and the second pixel; and
performing the third pixel shading operation on the second pixel.

9. The method of claim 8, wherein determining that the second effect exhibits a high frequency variation comprises:
evaluating the fourth coarse shading value; and
activating a first granularity bit that is associated with both the second effect and the first set of pixels.

10. The method of claim 2, wherein the first set of pixels that includes the first pixel and the second pixel comprises a pixel block, and further comprising:
receiving fragments associated with the pixel block; and
determining a plurality of coarse shading pixels that includes the first pixel and does not include the second pixel, wherein the plurality of coarse shading pixels is a subset of the first set of pixels.

11. The method of claim 10, wherein the fragments specify a pixel block visibility mask, and determining the plurality of coarse shading pixels comprises selecting the plurality of coarse shading pixels based on the pixel block visibility mask.

12. A non-transitory computer-readable storage medium including instructions that, when executed by a processor, cause the processor unit to perform pixel shading operations, by performing the steps of:
selecting, from a plurality of pixels, a subset of pixels for coarse shading operations based on which pixels included in the plurality of pixels are covered by a graphics primitive;
performing a first pixel shading operation on a first pixel included in the subset of pixels to compute a first coarse shading value that is associated with the first pixel;
determining a second coarse shading value that is associated with a second pixel based on the first coarse shading value;
performing a second pixel shading operation on the first pixel to compute a first fine shading value that is associated with the first pixel;
performing the second pixel shading operation on the second pixel to compute a second fine shading value that is associated with the second pixel;
computing a first composite shading value that is associated with the first pixel based on the first coarse shading value and the first fine shading value; and
computing a second composite shading value that is associated with the second pixel based on the second coarse shading value and the second fine shading value.

13. The computer-readable storage medium of claim 12, wherein determining the second coarse shading value comprises:
performing the first pixel shading operation on a third pixel to compute a third coarse shading value that is associated with the third pixel;
performing an interpolation operation between the first coarse shading value and the third coarse shading value to determine a first estimated value;
determining that a first effect that is associated with the first pixel shading operation exhibits a low frequency variation across a first set of pixels that includes the first pixel, the second pixel, and the third pixel; and
setting the second coarse shading value to equal the first estimated value.

14. The computer-readable storage medium of claim 13, wherein determining that the first effect exhibits a low frequency variation comprises:
evaluating at least one of the first coarse shading value, the third coarse shading value, and the first estimated value; and
deactivating a first granularity bit that is associated with both the first effect and the first set of pixels.

15. The computer-readable storage medium of claim 14, wherein the first set of pixels comprises a pixel block that includes a first quad, and deactivating the first granularity bit causes the first quad to be associated with a first warp that includes a first thread that computes the first composite shading value.

16. The computer-readable storage medium of claim 12, wherein computing the second composite shading value comprises combining the second coarse shading value, the second fine shading value, and a third fine shading value.

17. The computer-readable storage medium of claim 16, wherein determining the third fine shading value comprises:
performing a third pixel shading operation on the first pixel to determine a fourth coarse shading value that is associated with the first pixel;
determining that a second effect that is associated with the third pixel shading operation exhibits a high frequency variation across a first set of pixels that includes the first pixel and the second pixel; and
performing the third pixel shading operation on the second pixel.

18. The computer-readable storage medium of claim 17, wherein determining that the second effect exhibits a high frequency variation comprises:
evaluating the fourth coarse shading value; and
activating a first granularity bit that is associated with both the second effect and the first set of pixels.

19. The computer-readable storage medium of claim 12, wherein the first set of pixels that includes the first pixel and the second pixel comprises a pixel block, and further comprising:
receiving fragments associated with the pixel block; and
determining a plurality of coarse shading pixels that includes the first pixel and does not include the second pixel, wherein the plurality of coarse shading pixels is a subset of the first set of pixels.

20. The computer-readable storage medium of claim 19, wherein the fragments specify a pixel block visibility mask, and determining the plurality of coarse shading pixels comprises selecting the plurality of coarse shading pixels based on the pixel block visibility mask.

21. A system comprising:
a memory; and
a pixel shading subsystem coupled to the memory and configured to:
  select, from a plurality of pixels, a subset of pixels for coarse shading operations based on which pixels included in the plurality of pixels are covered by a graphics primitive;
  perform a first pixel shading operation on a first pixel included in the subset of pixels to compute a first coarse shading value that is associated with the first pixel;
  perform a second pixel shading operation on the first pixel to compute a first fine shading value that is associated with the first pixel; and
  compute a first composite shading value that is associated with the first pixel based on the first coarse shading value and the first fine shading value.

22. The system of claim 21, wherein the pixel shading subsystem is configured to determine a second coarse shading value that is associated with a second pixel by:
  performing the first pixel shading operation on a third pixel to compute a third coarse shading value that is associated with the third pixel;
  performing an interpolation operation between the first coarse shading value and the third coarse shading value to determine a first estimated value;
  determining that a first effect that is associated with the first pixel shading operation exhibits a low frequency variation across a first set of pixels that includes the first pixel, the second pixel, and the third pixel; and
  setting the second coarse shading value to equal the first estimated value.

23. The system of claim 21, wherein the pixel shading subsystem is implemented within a graphics processing cluster.

24. The system of claim 21, wherein the pixel shading subsystem is implemented within a graphics processing unit.

25. A computer-implemented method for performing pixel shading operations, the method comprising:
  selecting, from one or more pixel blocks, a subset of pixels for coarse shading operations based on which pixels included in the one or more pixel blocks are covered by a graphics primitive;
  performing a first pixel shading operation on a first pixel included in the subset of pixels to compute a first coarse shading value that is associated with the first pixel;
  performing the first pixel shading operation on a second pixel to compute a second coarse shading value that is associated with the second pixel;
  performing an interpolation operation between the first coarse shading value and the second coarse shading value to determine a third coarse shading value that is associated with a third pixel; and
  outputting at least the third coarse shading value as a final pixel value for display.

* * * * *

UNITED STATES PATENT AND TRADEMARK OFFICE
CERTIFICATE OF CORRECTION

PATENT NO. : 9,552,667 B2  
APPLICATION NO. : 14/106580  
DATED : January 24, 2017  
INVENTOR(S) : Yong He et al.

Page 1 of 1

It is certified that error appears in the above-identified patent and that said Letters Patent is hereby corrected as shown below:

In the Claims

Column 19, Claim 12, Line 47, please delete "unit".

Signed and Sealed this
Thirteenth Day of June, 2017

Joseph Matal
*Performing the Functions and Duties of the
Under Secretary of Commerce for Intellectual Property and
Director of the United States Patent and Trademark Office*